United States Patent [19]

Hino et al.

[11] Patent Number: 5,066,771

[45] Date of Patent: Nov. 19, 1991

[54] METHOD FOR PRODUCING AN IMIDE OLIGOMER

[75] Inventors: Seiichi Hino, Yokohama; Shoichi Satou, Sagamihara; Kouji Koura; Osamu Suzuki, both of Yokohama, all of Japan

[73] Assignee: Kozo Iizuka, Director-General of Agency of Industrial Science and Technology, Tokyo, Japan

[21] Appl. No.: 502,741

[22] Filed: Apr. 2, 1990

Related U.S. Application Data

[63] Continuation of Ser. No. 152,490, Feb. 5, 1988, abandoned.

[30] Foreign Application Priority Data

Feb. 10, 1987 [JP] Japan .................................. 62-027219

[51] Int. Cl.$^5$ ..................... C08G 69/26; C08G 69/28; C08G 8/02; C08F 22/40
[52] U.S. Cl. ..................... 528/353; 528/125; 528/126; 528/220; 528/229; 528/351; 526/262
[58] Field of Search ............... 528/353, 125, 126, 220, 528/229, 351; 526/262

[56] References Cited

U.S. PATENT DOCUMENTS 3,745,149  7/1973  Serafini et al. ...................... 528/288
3,879,349  4/1975  Bilow et al. .......................... 528/127

FOREIGN PATENT DOCUMENTS 31961  11/1972  Japan .
79591   6/1975  Japan .
167569  3/1983  Japan .

*Primary Examiner*—John Kight, III
*Assistant Examiner*—P. Hampton-Hightower
*Attorney, Agent, or Firm*—Oblon, Spivak, McClelland, Maier & Neustadt

[57] ABSTRACT

A method for producing an imide oligomer soluble in an organic solvent by reacting three components of an aromatic tetracarboxylic acid or its derivative, an aromatic diamine and an end-capping agent, wherein the aromatic diamine is a condensation product of o-ethylaniline with formaldehyde, and the end-capping agent is an ethynyl phthalic acid of the formula:

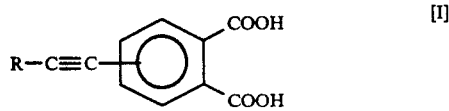

[I]

wherein R is a hydrogen atom or a monovalent group selected from the group consisting of an aliphatic group, an alicyclic group and an aromatic group, or its derivative.

10 Claims, No Drawings

METHOD FOR PRODUCING AN IMIDE OLIGOMER

This is a continuation of application Ser. No. 07/152,490, filed on Feb. 5, 1988, now abandoned.

BACKGROUND OF THE INVENTION

1. FIELD OF THE INVENTION

The present invention relates to a method for producing an imide oligomer soluble in an organic solvent, which is excellent in the stability and moldability, and it provides a precursor substance which is thermally self-curable without producing a volatile substance such as water or an alcohol to form a polyimide resin having excellent heat resistance. More particularly, it relates to a method for producing an imide oligomer suitable for the production of a fiber-reinforced composite material having excellent heat resistance, which has glass fibers, aramide fibers, carbon fibers, almina fibers or silicon carbide fibers as a reinforcing material.

2. DISCUSSION OF BACKGROUND

It has already been known that a polyimide resin having excellent heat resistance can be obtained by the reaction of an aromatic diamine with pyromellitic dianhydride PMDA or 3,3',4,4'-benzophenonetetracarboxylic dianhydride (BTDA) or with its derivative such as its acid or lower alkyl ester. Such a polyimide is usually insoluble and infusible, and its moldability is extremely poor. Therefore, the molding is conducted in the form of its precursor such as polyamide acid or polyamide ester, followed by the conversion of the molded precursor to imide. During the conversion to imide, volatile substances such as water and an alcohol are produced, and when such a process is applied to a fiber-reinforced composite material, voids are likely to be formed, such being undesirable. Further, a solution of polyamide acid or polyamide ester is usually highly viscous, and it is difficult to prepare a prepreg. Besides, the stability of such a precursor is so poor that it is practically impossible to store the prepreg for a long period of time.

U.S. Pat. No. 3,745,149 discloses a method for producing a polyimide which is applicable to a fiber-reinforced composite material. This method comprises preparing a prepreg from a solution of a three-component mixture of an aromatic tetracarboxylic acid dialkyl ester, an aromatic diamine and an unsaturated dicarboxylic acid alkyl ester, followed by molding. According to this method, the preparation of the prepreg can easily be conducted by the reduction of the viscosity of the solution, but the stability of the prepreg is not adequate, and a low temperature is required for the storage for a long period of time. Further, the molding requires a two step reaction comprising formation of a precursor and curing, whereby volatile substances such as water and an alcohol are formed, thus leading to formation of voids and poor moldability.

The present inventors have previously filed a patent application for a method of producing a solvent-soluble imide oligomer as a precursor for a polyimide resin for a composite material, having the storage stability and moldability improved (Japanese Unexamined Patent Publication No. 167569/1984). By using such an imide oligomer, the storage stability and moldability can be improved, but the heat resistance is not adequate.

SUMMARY OF THE INVENTION

It is an object of the present invention to provide an imide oligomer which maintains the storage stability and moldability and which is capable of being converted to a polyimide having excellent heat resistance.

The present invention provides a method for producing an imide oligomer soluble in an organic solvent by reacting as three components an aromatic tetracarboxylic acid or its derivative, (ii) an aromatic diamine and (iii) a end-capping agent, wherein the aromatic diamine is a condensation product of o-ethylaniline with formaldehyde, and the end-capping agent is an ethynyl phthalic acid of the formula:

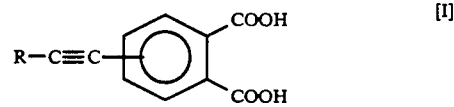

wherein R is a hydrogen atom or a monovalent group selected from the group consisting of an aliphatic group, an alicyclic group and an aromatic group, or its derivative, and wherein the molar ratio of said tetracarboxylic acid (i) to diamine (ii) is 1 to 2.

The imide oligomer obtained by the above method maintains the storage stability and moldability and yet is capable of providing a cured product having high heat resistance, particularly high heat decomposition temperature. The imide oligomer of the present invention is soluble in an organic solvent and has a low molecular weight. Thus, it has a low viscosity in the form of a solution, whereby the preparation of a prepreg is easy. Since the oligomer is already in the form of imide, the storage stability is excellent, and the molding can be conducted simply by a curing reaction without necessity of a reaction for the conversion to imide, whereby no formation of volatile substances such as water and an alcohol takes place, and the formation of voids is minimum. Thus, it is possible to produce a fiber-reinforced composite material having good thermal and mechanical properties.

DETAILED DESCRIPTION OF THE PREFERRED EMBODIMENTS

The aromatic tetracarboxylic acid useful as one of the components of the present invention may be at least one member selected from the group consisting of pyromellitic acid, 3,3',4,4'-benzophenonetetracarboxylic acid, 3,3',4,4'-diphenyl ether tetracarboxylic acid, 3,3',4,4'-diphenyltetracarboxylic acid, 2,3,6,7-naphthalenetetracarboxylic acid, 2,3,4,5-thiophenetetracarboxylic acid, 3,4,9,10-perylenetetracarboxylic acid and 2,2-bis(3,4-dicarboxyphenyl)propane, and their isomers. Such an aromatic tetracarboxylic acid component may be used in the form of its derivative such as a lower alkyl ester or dianhydride. However, in view of the reactivity, it is preferred to use the dianhydride.

The aromatic diamine component to be used in the present invention is a condensation product of o-ethylaniline with formaldehyde. As disclosed in Japanese Unexamined Patent Publication No. 31961/1972, a condensation product of o-ethylaniline with formaldehyde can be obtained by the reaction in an aqueous medium in the presence of a strong inorganic acid such as hydrochloric acid or sulfuric acid at a temperature of from 60° to 100° C. In this reaction, a triamine, tetramine, etc. will be produced as by-products in addition to 3,3'-diethyl-4,4'-diaminodiphenylmethane as the diamine component. Such by-products may readily be separated by distillation to obtain the diamine component. However, the reaction product may be used directly for the preparation of the imide oligomer without separating such by-products. However, if a polyamine such as a triamine or higher amine increases, gelation is likely to be led during the preparation of the oligomer, and the content of such a polyamine is preferably at most 70% by weight. Further, by an addition of aniline during the condensation reaction of o-ethylaniline, a three component mixture comprising 3,3'-diethyl-4,4'-diaminodiphenylmethane, 3-ethyl-4,4'-diaminodiphenylmethane and 4,4'-diaminodiphenylmethane can be obtained, and this mixture can effectively be used in the present invention. It is also possible to use an o-ethylaniline condensation product obtained by an addition of an aniline derivative having a substituent at a postion other than the p-position, such as o-toluidine or o-chloroaniline. Furthermore, a part of the o-ethylaniline condensation product may be substituted by other diamine so long as the resulting imide oligomer will be soluble in an organic solvent. Such a diamine may be, for example, represented by the formula $H_2N-R-NH_2$ wherein R is a bivalent group having not more than 30 carbon atoms, which may optionally contain an oxygen atom, a sulfur atom, a nitrogen atom, a silicon atom, a phosphorus atom or similar inert groups. R is preferably a straight chained or branched alkylene group, a cycloalkylene group, a single or poly-cyclic aromatic group or a plurality of cycloalkylene or aromatic groups bonded directly by a carbon linkage or by a bivalent connecting group. The bivalent connecting group includes -O-, -$SO_2$-, -S-, -CO- and an alkylene group having from 1 to 3 carbon atoms (except for the condensation product of o-ethylaniline with formaldehyde). One or more of these diamines may be employed in place of a part of the o-ethylaniline condensation product, but the amount is usually not higher than 50 mol % of the total diamines.

The end-capping agent to be used as one of the components of the present invention is an ethynylphthalic acid of the formula:

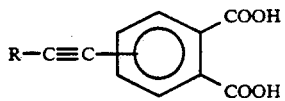 [I]

wherein R is a hydrogen atom or a monovalent group selected from the group consisting of an aliphatic group, an alicyclic group and an aromatic group, or its derivative. The R-substituted ethynyl group in the formula I may be an ethynyl group, a phenylethynyl group, a 4-phenyl-1,3-butadiyne group or a 4-phenyl-buta-1-yne-3-ene group. One or more of such ethynyl phthalic acids or their derivatives may be used. In any case, in view of the reactivity, it is preferred to employ an acid anhydride.

The imide oligomer soluble in an organic solvent can be prepared by reacting the above-mentioned three components of the aromatic tetracarboxylic acid component, the aromatic diamine component and the end-capping agent component in a solvent. As the solvent, an amide-type polar solvent such as N,N-dimethylformamide, N,N-dimethylacetamide, N-methylpyrrolidone or N-methylcaprolactam, a phenol such as m-cresol, or dimethyl sulfoxide, may be employed. In such a solvent, predetermined amounts of the three components are reacted at room temperature or under heating to obtain an amide acid oligomer, followed by dehydration cyclization to obtain an imide oligomer. As the dehydrating agent, a carboxylic acid anhydride such as acetic anhydride, propionic anhydride, butyric anhydride, valeric anhydride, succinic anhydride or phthalic anhydride may be used. As the dehydrating agent, acetic anhydride is usually preferred in view of the economical nature and the convenience for the purification after the reaction. The dehydrating agent is used usually within a range of from 1 to 5 mol, preferably from 1.1 to 3 mol, per mol of the amide acid group. Further, a catalyst may be used as the case requires. As the catalyst, a known alkali metal compound or tertiary amine may be employed. The amide acid oligomer can readily be converted to the imide oligomer by reacting it in the presence of such a dehydrating agent and a catalyst at a temperature of from room temperature to 120° C., preferably from 40° to 100° C.

The proportions may be represented by a molar ratio of tetracarboxylic acid/diamine/end-capping agent=1/2/2. In order to ensure the introduction of the terminal functional group, it is possible to use an excess amount of the ethynyl phthalic acid or its derivative for the reaction and remove it by purification after the reaction. However, the ratio of tetracarboxylic acid/diamine should be strictly adjusted.

Although the solubility varies depending upon the composition and the molecular weight the imide oligomer of the present invention is soluble in a ketone such as acetone or methyl ethyl ketone, an ether such as tetrahydrofuran, dioxane or dimethoxyethane, or a halogenated solvent such as chloroform or dichloromethane as well as in the solvent used for the preparation of the imide oligomer. The viscosity of the solution of the imide oligomer dissolved in such a solvent is low, whereby the prepreg can easily be produced. The prepreg is usually produced by immersing reinforcing fibers such as carbon fibers in a solution of from 20 to 80% by weight, followed by drying under heating. Having already converted to imide, the prepreg is excellent in the storage stability, and the molding can simply be effected by a curing reaction without requiring the imidization reaction, whereby no volatile substances will be formed and the formation of the voids will be minimum.

The imide oligomer of the present invention comprises an aromatic imide structure having excellent heat resistance, and terminal self-curable cross-linking groups. By heating it, it is possible to obtain a cured product of an imide resin having excellent heat resistance. Further, it is soluble in an organic solvent, whereby various additives and reinforcing agents, for example, reactive-diluents such as diallyl phthalate, triallyl isocyanurate and divinyl benzene, carbon powder, various metals, metal oxizes, silica, asbestos, etc., can readily be incorporated. Thus, it can be used not only for the preparation of a fiber-reinforced composite material, but also for the production of an adhesive, a coating material or a shaped product having excellent heat resistance.

Now, the method for producing an imide oligomer of the present invention will be described in further detail with reference to Examples. However, it should be understood that the present invention is by no means restricted to these specific Examples.

EXAMPLE 1

19.9 g (0.078 mol) of 3,3'-diethyl-4,4'-diaminodiphenylmethane (bp: 242° C./6 mmHg) obtained by the distillation under reduced pressure of an o-ethylaniline-formaldehyde condensation product (Kaya Hard A-A, tradename of Nippon Kayaku Co. Ltd.), was dissolved in 50 ml of N-methyl-2-pyrrolidone (NMP). Under a nitrogen atmosphere, a suspension comprising 12.6 g (0.039 mol) of 3,3',4,4'-benzophenonetetracarboxylic dianhydride (BTDA) and 100 ml of NMP was gradually added thereto over a period of 60 minutes (BTDA/diamine=1/2 in molar ratio). The mixture was stirred at room temperature for one hour, and then 13.4 g (0.0937 mol) of solid 4-ethynylphthalic anhydride was added thereto. The mixture was stirred at room temperature for further 8 hours, and then 32.0 g (0.312 mol) of acetic anhydride and 1.6 g (0.0195 mol) of sodium acetate were added thereto. The temperature was raised to 70° C. over a period of about 30 minutes, and the reaction was conducted for one hour. After the completion of the reaction, the mixture was cooled, and the uniform transparent product solution was poured into water to precipitate an oligomer. The oligomer was collected by filtration and subjected to washing with a 1% sodium hydrogen carbonate aqueous solution until the generation of bubbles was no longer observed. After the separation by filtration, the oligomer was washed a few times with a water/methanol mixture. The product was dried under reduced pressure at 60° C. for 50 hours to obtain white powder. The yield was 96.3%, i.e. substantially quantitative. In the IR spectrum chart of the oligomer, an absorption attributable to an imide group was observed at 1780 cm$^{-1}$ and 720 cm$^{-1}$, and an absorption attributable to an ethynyl group was observed at 2160 cm$^{-1}$. The imide oligomer was soluble in acetone, methyl ethyl ketone (MEK), tetrahydrofuran (THF) and N,N-dimethylformamide (DMF) at a concentration of more than 30% by weight.

COMPARATIVE EXAMPLE 3

10.2 g (0.040 mol) of 3,3'-diethyl-4,4'-diaminodiphenylmethane as used in Example 1, 8.6 g (0.027 mol) of BTDA (BTDA/diamine=2/3 in molar ratio) and 8.26 g (0.048 mol) of 4-ethynylphthalic anhydride were stirred at room temperature for 8 hours, and then 16.4 g (0.160 mol) of acetic anhydride and 0.82 g (0.010 mol) of sodium acetate were added thereto. In the same manner as in Example 1, an imide oligomer was prepared. The obtained oligomer showed a distinct absorption attributable to an imide group in its IR analysis, and it was soluble in acetone, MEK, THF and DMF at a concentration of more than 30% by weight.

EXAMPLE 2

12.7 g (0.050 mol) of 3,3'-diethyl-4,4'-diaminodiphenylmethane as used in Example 1, 5.45 g (0.025 mol) of pyromellitic dianhydride (PMDA) (PMDA/diamine=1/2 in molar ratio) and 10.3 g (0.060 mol) of 4-ethynylphthalic anhydride were stirred at room temperature for 7.5 hours, and then 20.4 g (0.20 mol) of acetic anhydride and 1.0 g (0.015 mol) of sodium acetate were added thereto. In the same manner in Example 1, an imide oligomer was prepared, separated, washed and dried. The yield was quantitative. The obtained oligomer showed a distinct absorption attributable to an imide group in its IR analysis, and it was soluble in acetone, MEK, THF and DMF at a concentration of more than 30% by weight.

EXAMPLE 3

26.4 g (0.10 mol) of an o-ethylaniline-formaldehyde condensation product (Kaya Hard A-A, tradename of Nippon Kayaku Co. Ltd., diamine component as measured by GPC: 67%) was dissolved in N,N-dimethylformamide (DMF), and then 10.9 g (0.050 mol) of PMDA was added thereto (acid anhydride/amine=1/2 in molar ratio). The reaction was conducted at room temperature for 2 hours, and then 20.6 g (0.120 mol) of 4-ethynylphthalic anhydride was added thereto. The mixture was stirred at room temperature for 3 hours, and then left to stand overnight. To a solution of the formed amide acid oligomer, 40.8 g (0.40 mol) of acetic anhydride and 2.05 g (0.025 mol) of sodium acetate were added. The temperature was raised to 70° C. and the reaction was conducted for one hour to obtain an imide ologomer. In the same manner as in Example 1, the imide oligomer was separated, washed and dried. The yield was substantially quantitative. The obtained oligomer showed a distinct absorption attributable to an imide group in its IR analysis. Further, it was soluble in THF, MEK and DMF at a concentration of more than 30% by weight.

EXAMPLE 4

16.0 g (0.063 mol) of 3,3'-diethyl-4,4'-diaminodiphenylmethane as used in Example 1 and 10.1 g (0.0315 mol) of BTDA (BTDA/diamine=1/2 in molar ratio) was stirred in NMP at room temperature for one hour, and then 18.7 g (0.075 mol) of 4-(phenylethynyl)phthalic anhydride was added thereto. The mixture was reacted at room temperature for further 8 hours. To a solution of the formed amide acid oligomer, 25.7 g (0.252 mol) of acetic anhydride and 1.28 g (0.0157 mol) of sodium acetate were added, and the mixture was reacted at 70° C. for two hours to obtain an imide oligomer. In the same manner as in Example 1, the imide oligomer was separated, washed and dried. The yield was substantially quantitative. The obtained oligomer showed a distinct absorption attributable to an imide group in its IR analysis, and a distinct absorption attributable to a phenylethylnyl group was also observed at 2160 cm$^{-1}$. Further, it was soluble in acetone, MEK, THF and DMF at a concentration of more than 30% by weight.

COMPARATIVE EXAMPLE 1

12.7 g (0.05 mol) of 3,3'-diethyl-4,4'-diaminodiphenylmethane as used in Example 1 was dissolved in 40 ml of NMP under a nitrogen atmosphere, and a suspension comprising 32.2 g (0.10 mol) of BTDA and 40 ml of NMP was added thereto (BTDA/diamine=2/1 in molar ratio). The mixture was stirred at room temperature for 30 minutes, and then a solution comprising 12.9 g (0.11 mol) of 3-ethynylaniline and 40 ml of NMP was added thereto. Then, the reaction was conducted at room temperature for one hour. To the formed amide acid oligomer, 40.8 g (0.40 mol) of acetic anhydride and 2.05 g of sodium acetate were added, and the mixture was reacted at 70° C. for one hour. As the reaction proceeded, the solution became opaque. The reaction mixture was cooled and poured into a large amount of water to precipitate the oligomer. In the same manner as in Example 1, the oligomer was washed and dried.

The yield was substantially quantitative. The obtained oligomer clearly indicated the presence of an imide ring and an ethynyl group in its IR analysis. It was soluble in NMP but insoluble in THF and MEK.

COMPARATIVE EXAMPLE 2

By using 25.4 g (0.10 mol) of 3,3'-diethyl-4,4'-diaminodiphenylmethane as used in Example 1, 16.1 g (0.05 mol) of BTDA and 18.1 g (0.11 mol) of 5-norbornene-2,3-dicarboxylic anhydride, an amide acid oligomer was prepared in the same manner as in Comparative Example 1. Then, the temperature was raised to 200° C. over a period of one hour, and the reaction was conducted at this temperature for 2 hours for conversion to imide. After cooling, the uniform transparent solution was poured into a large amount of water to precipitate an imide oligomer. In the same manner as in Example 1, the imide oligomer was washed and dried. The yield was substantially quantitative, and its IR analysis clearly indicated the presence of the imide ring. This imide oligomer was soluble in DMF, THF and MEK.

COMPARATIVE EXAMPLE 3

10.2 g (0.040 mol) of 3,3'-diethyl-4,4'-diaminodiphenylmethane as used in Example 1, 8.6 g (0.027 mol) of BTDA (BTDA/diamine=2/3 in molar ratio) and 8.26 g (0.048 mol) of 4-ethynylphthalic anhydride were stirred at room temperature for 8 hours, and then 16.4 g (0.160 mol) of acetic anhydride and 0.82 g (0.010 mol) of sodium acetate were added thereto. In the same manner as in Example 1, an imide oligomer was prepared. The obtained oligomer showed a distinct absorption attributable to an imide group in its IR analysis, and it was soluble in acetone, MEK, THF and DMF at a concentration of more than 30% by weight.

Preparation and Evaluation of Cured Products

The imide oligomer powder of each of Examples 1 to 3 and Comparative Example 3 was placed in a mold and subjected to curing at 200° C. for 4 hours (7kg/cm²) and then to after-curing at 250° C. for two hours, at 290° C. for one hour and at 320° C. for 6 hours. The powder of each of Example 5 and Comparative Example 2 was likewise placed in a mold and subjected to curing at 290° C. for 4 hours and then to after-curing at 320° C. for 6 hours. The glass transition temperature (Tg) of each cured product was measured by a thermal mechanical analysis apparatus (TMA). Further, the heat decomposition temperature (Td 5%) of the cured product powder was measured by a thermal gravimetric analysis apparatus (TGA). The results are shown in Table 1.

The imide oligomer powder of Comparative Example 1 was subjected to curing at a temperature of from 200° to 250° C. However, the powder did not melt although slightly fused, and no satisfactory cured product was obtained.

TABLE 1

| | Properties of imide oligomers | | | | Heat resistance (cured product) | |
|---|---|---|---|---|---|---|
| | Solubility | | | | Td 5% (°C.) | |
| | NMP | THF | Acetone | Tg (°C.) | (In air) | (In N₂) |
| EXAMPLE 1 | Soluble | Soluble | Soluble | 327 | 432 | 478 |
| COMPARATIVE EXAMPLE 3 | " | " | " | 312 | 438 | 489 |
| EXAMPLE 2 | " | " | " | 345 | 430 | 472 |
| EXAMPLE 3 | " | " | " | 350 | 432 | 476 |
| EXAMPLE 4 | " | " | " | 314 | 438 | 487 |
| COMPARATIVE EXAMPLE 1 | " | Insoluble | Insoluble | — | — | — |
| COMPARATIVE EXAMPLE 2 | " | Soluble | Soluble | 321 | 410 | 457 |

From Table 1, it is evident that when 3-ethynylaniline was used as the end-capping agent, the solubility deteriorated, and when the conventional 5-norbornene-2,3-dicarboxylic anhydride was used, the heat resistance, particularly the heat decomposition resistance, detriorated. The imide oligomers of the present invention are superior in the solubility and heat resistance.

According to the present invention, it is possible to obtain an imide oligomer which is excellent in the stability and moldability and which is suitable for the production of a fiber-reinforced composite material having excellent heat resistance. Thus, the present invention is industrialy useful.

What is claimed is:

1. A method for producing an imide oligomer soluble in an organic solvent by reacting as three components (i) an aromatic tetracarboxylic acid or its derivative, (ii) an aromatic diamine and (iii) an end-capping agent, the molar ratio of said tetracarboxylic acid (i) to said diamine (ii) being 1 to 2, wherein the aromatic diamine is a condensation product of o-ethylaniline with formaldehyde, and the end-capping agent is an ethynyl phthalic acid of the formula:

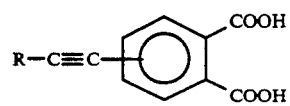

wherein R is a hydrogen atom or a monovalent group selected from the group consisting of an aliphatic group, an alicyclic group and an aromatic group, or its derivative.

2. The method according to claim 1, wherein the end-capping agent is ethynyl phthalic anhydride.

3. The method according to claim 1, wherein the aromatic tetracarboxylic acid is at least one member selected from the group consisting of pyromellitic acid, 3,3', 4,4'-benzophenonetetracarboxylic acid, 3,3', 4,4'-diphenyl ether tetracarboxylic acid, 3,3', 4,4'-diphenyltetracarboxylic acid, 2,3,6,7-naphthalene-tetracarboxylic acid, 2,3,4,5-thiophenetetracarboxylic acid, 3,4,9,10-perylenetetracarboxylic acid and 2,2-bis(3,4-dicarboxyphenyl)propane.

4. The method according to claim 1, wherein the derivative of an aromatic tetracarboxylic acid is a lower alkyl ester or dianhydride of an aromatic tetracarboxylic acid.

5. The method according to claim 1, wherein the R-substituted ethynyl group in the formula I is an ethynyl group, a phenyl-ethynyl group, a 4-phenyl-1,3-butadiyne group or a 4-phenyl-buta-1-yne-3-ene group.

6. The method according to claim 1, wherein the derivative of an ethynyl phthalic acid of the formula I is an anhydride of an ethynyl phthalic acid of the formula I.

7. The method according to claim 3 wherein the derivative of an ethynyl phthalic acid of the formula (I) is an anhydride of an ethynyl phthalic acid of formula (I).

8. The product of the process of claim 1.

9. The product of the process of claim 7.

10. The method according to claim 3, wherein the aromatic tetracarboxylic acid is at least one member selected from the group consisting of pyromellitic acid, 3,3', 4,4'-benzophenonetetracarboxylic acid, and 3,3'4,4'-diphenyltetracarboxylic acid.

* * * * *